United States Patent [19]

Sekiguchi et al.

[11] 4,450,825
[45] May 29, 1984

[54] EGR CONTROL SYSTEM FOR DIESEL ENGINE

[75] Inventors: Kiyonori Sekiguchi, Aichi; Toshihiko Igashira, Toyokawa; Takeshi Tanaka; Hisasi Kawai, both of Toyohashi, all of Japan

[73] Assignee: Nippon Soken, Inc., Nishio, Japan

[21] Appl. No.: 454,099

[22] Filed: Dec. 28, 1982

[30] Foreign Application Priority Data

Dec. 28, 1981 [JP] Japan .................. 56-209793
Feb. 10, 1982 [JP] Japan .................. 57-18896

[51] Int. Cl.³ .................................... F02M 25/06
[52] U.S. Cl. ......................... 123/569; 123/571
[58] Field of Search ..................... 123/569, 571

[56] References Cited

U.S. PATENT DOCUMENTS

| | | | |
|---|---|---|---|
| 4,071,003 | 1/1978 | Aono | 123/571 |
| 4,237,837 | 12/1980 | Tuda et al. | 123/569 |
| 4,333,438 | 6/1982 | Perez et al. | 123/569 |
| 4,333,440 | 6/1982 | Eheim | 123/569 |
| 4,349,004 | 9/1982 | Matsuda | 123/569 |
| 4,369,753 | 1/1983 | Sugiyama | 123/569 |
| 4,373,496 | 2/1983 | Greiner et al. | 123/569 |
| 4,373,497 | 2/1983 | Hamren | 123/569 |
| 4,375,800 | 3/1983 | Otsuka et al. | 123/569 |

FOREIGN PATENT DOCUMENTS

| | | | |
|---|---|---|---|
| 2911209 | 10/1980 | Fed. Rep. of Germany | 123/569 |
| 56-129747 | 10/1981 | Japan | 123/569 |
| 56-151252 | 11/1981 | Japan | 123/569 |
| 56-159554 | 11/1981 | Japan | 123/569 |

*Primary Examiner*—Wendell E. Burns
*Attorney, Agent, or Firm*—Cushman, Darby & Cushman

[57] ABSTRACT

In an EGR control system for a diesel engine, the EGR amount is controlled by controlling the pressure in a diaphragm chamber of an EGR valve using the output signal of a computer, responsive to signals from a plurality of engine running condition sensors, for calculating the EGR amount with corrections according to the engine running conditions and the excess air rate. In some cases, the EGR is carried out only when the rotational speed of the engine is higher than a predetermined rotational speed. Also, in some cases, the EGR is carried out when an occurrence of idling is detected, even if the rotational speed of the engine is lower than the predetermined rotational speed.

10 Claims, 12 Drawing Figures

EGR CONTROL SYSTEM FOR DIESEL ENGINE

BACKGROUND OF THE INVENTION

1. Filed of the Invention

The present invention relates to a system for exhaust gas recirculation (EGR) in a diesel engine, more particularly an EGR system in a diesel engine for an automotive vehicle.

2. Description of the Prior Art

In general, in an engine having an EGR system, reduction of $NO_x$ cannot be achieved when the amount of EGR is too small, while the production of HC, CO, or smoke is increased when the amount of EGR is too large. Under these circumstances, it is appropriate to regard as optimum the amount of EGR just before which the production of any one of HC, CO, and smoke suddenly increases. Based on the above-described view, researchers have investigated the optimum amount of EGR under various running conditions for various kinds of engines. They found that the optimum amount of EGR is given by a specific relationship between the EGR rate and a ratio between the fuel amount and the sum of the intake air amount and EGR gas amount. Basically, it was found that the optimum amount of EGR is independent of the engine rotational speed. The rotational angle of the shaft of the fuel controller of some kinds of fuel supply devices, however, often differs in accordance with the difference in the engine rotational speed. Thus, it is necessary to compensate for the value of engine rotational speed.

Also, it has been shown desirable to reduce the EGR amount before the engine reaches the steady running state while the coolant temperature is still low.

It has also been shown desirable to reduce the EGR amount when the intake air amount is reduced, in accordance with the absolute pressure in the air intake pipe or, alternatively, the excessive air rate in the exhaust pipe.

Although the above described facts have been known, no satisfactorily designed EGR control device has yet been proposed taking all of the above into account.

SUMMARY OF THE INVENTION

It is the object of the present invention to provide an improved EGR control system for a diesel engine in which the precision of EGR control is enhanced with corrections for the rotational speed of the engine, the coolant water or lubricant temperature, and the absolute pressure in the air intake pipe.

In accordance with the present invention, there is provided an EGR control system for a diesel engine, comprising: an EGR valve having a diaphragm chamber; a pressure supply means for supplying the negative pressure to the diaphragm chamber of the EGR valve; sensors for sensing a plurality of engine running conditions of the engine; a pressure control means inserted between the diaphragm chamber and the pressure supply means; and a computer responsive to signals from the sensors for calculating the EGR amount with corrections according to the running conditions of the engine, the output signal of the computer controlling the pressure control means. An excessive air rate λ signal, related to the ratio of the intake air amount to the fuel amount multiplied by the stoichiometric air-fuel ratio is also employed to correct the EGR amount.

DESCRIPTION OF THE PREFERRED EMBODIMENTS

Figure 1:
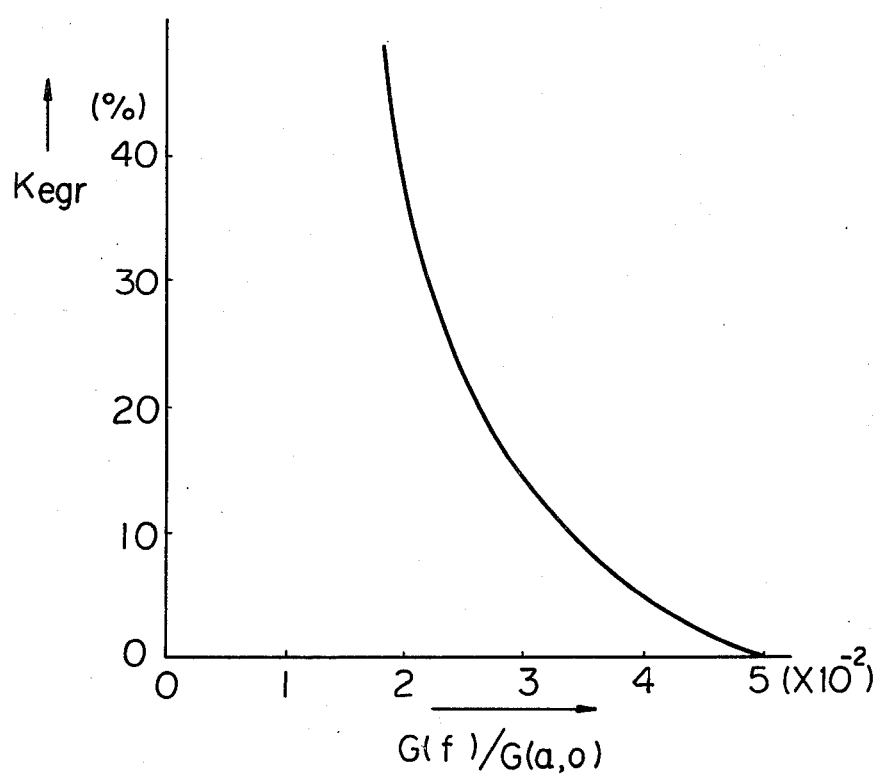
FIG. 1 illustrates the specific relationship, between the EGR rate and a ratio between the fuel amount and the sum of the intake air amount and EGR gas amount, for the optimum amount of EGR.
Figure 2:
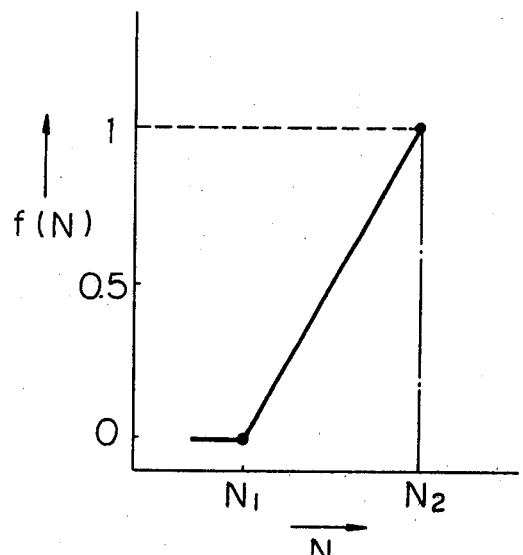
FIGS. 2 and 3 illustrate relationships for compensating the valve of the engine rotational speed.
Figure 3:
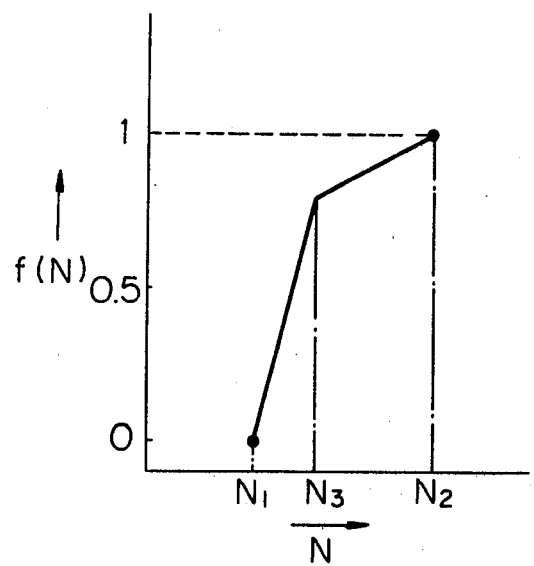

The specific relationship between the EGR rate and the ratio between the fuel amount and the sum of the intake air amount and EGR gas amount, for the optimum amount of EGR, is illustrated in FIG. 1. In FIG. 1, the ordinate represents the EGR rate Kegr, and the abscissa represents the ratio $G(f)/G(a,0)$ between the fuel amount $G(f)$ and the sum of the intake air amount and EGR gas amount, the sum being represented by the intake air amount $G(a,0)$ without EGR. Relationships for compensating the value of the engine rotational speed are illustrated in FIGS. 2 and 3. In FIGS. 2 and 3, the abscissa represents the rotational speed N, and the ordinate represents the correction coefficient regarding the rotational speed $f(N)$. $N_1$ is a lower side preselected rotational speed, $N_2$ is a higher side preselected rotational speed, and $N_3$ is an intermediate preselected rotational speed. The optimum amount of EGR is given from the relationship illustrated in FIG. 1 combined with the relationship illustrated in FIG. 2 or 3.

Figure 4:
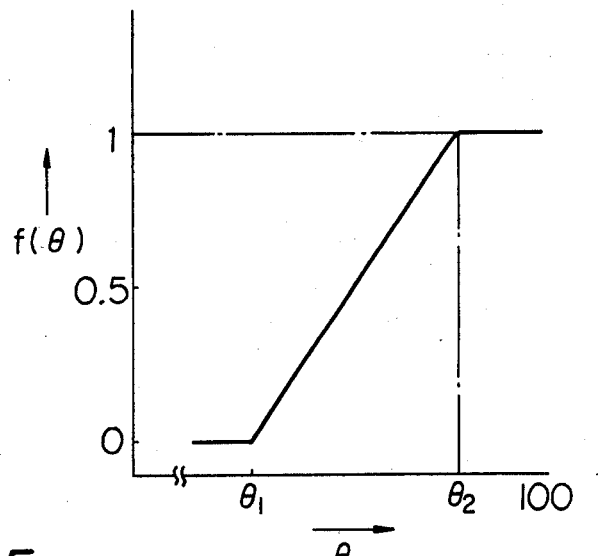
FIG. 4 illustrates a relationship for reducing the EGR amount before the engine reaches the steady running state while the coolant temperature is still low.

The relationship for reducing the EGR amount before the engine reaches the steady running state while the coolant water temperature is still low is illustrated in FIG. 4, showing the relationship between a coolant water temperature $\theta$ and a correction coefficient $f(\theta)$. In FIG. 4, the abscissa represents the coolant water temperature $\theta$, and the ordinate represents the correction coefficient regarding the coolant water temperature $f(\theta)$. $\theta_1$ is a lower side preselected temperature, and $\theta_2$ is a higher side preselected temperature.

Figure 5:
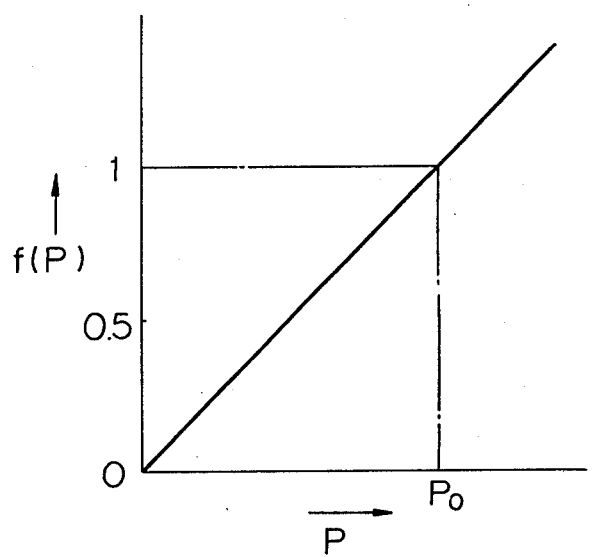
FIG. 5 illustrates a relationship for reducing the EGR amount when the intake air amount is reduced in accordance with the absolute pressure in the air intake pipe.

The relationship for reducing the EGR amount when the intake air amount is reduced in accordance with the absolute pressure in the air intake pipe is illustrated in FIG. 5, showing the relationship between an absolute pressure P in the air intake pipe and the correction coefficient $f(P)$. In FIG. 5, the abscissa represents the pressure P, and the ordinate represents the correction factor regarding the pressure f(P). In FIG. 5, $P_0$ represents the normal pressure, i.e., 760 mmHg.

Figure 6:
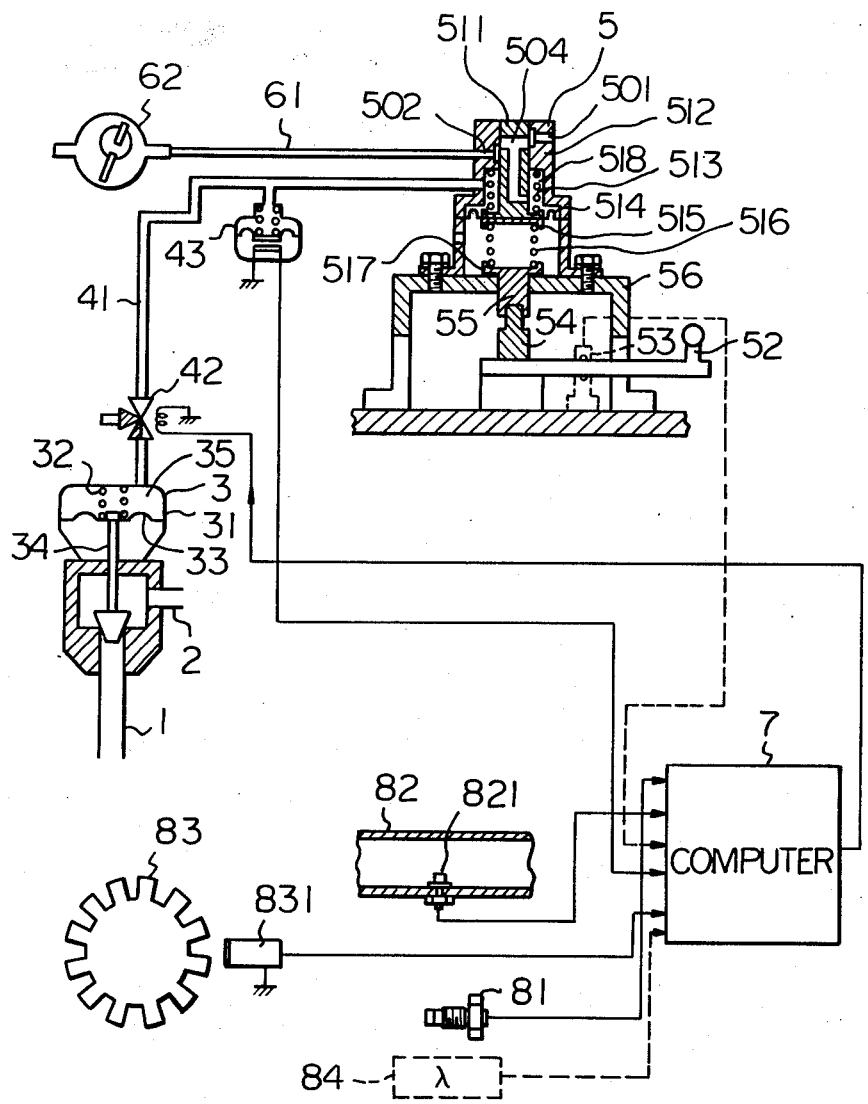
FIG. 6 illustrates an EGR control system for a diesel engine in accordance with an embodiment of the present invention.

An EGR control system for a diesel engine in accordance with a preferred embodiment of the present invention is illustrated in FIG. 6. The system of FIG. 6 includes a regulating valve 5 coupled to the fuel control shaft 54 of a fuel control lever 52, an EGR valve 3, a solenoid valve 42, a pressure transmission pipe 41, a vacuum switch 43, a vacuum source pipe 61, a vacuum pump 62, a computer 7, an engine rotational speed sensor 831, a coolant water temperature sensor 81, and a sensor 821 for sensing the absolute pressure in an air intake pipe 82.

The regulating valve 5 includes a casing 512, having an atmospheric port 501 and a vacuum port 502, and a slide shaft 511 which is fitted to and is adapted to slide smoothly in the casing 512. The slide shaft 511 has a vacuum channel 504 therein. A diaphragm 514 is attached to the bottom of the slide shaft 511 to prevent leaking and is supported by the casing 512. An air-tight chamber 518 is formed by the casing 512, the slide shaft 511, and the diaphragm 514. A compressed spring 513 is provided in the air-tight chamber 518 and is fixed at its top to the casing 512 and at its bottom to the slide shaft 511 so that the initial position of the slide shaft 511 is predetermined. Another compressed spring 516 is provided beneath the diaphragm 514 and is fixed at its top to the bottom 515 of the slide shaft 511 and at its bottom to the top 517 of a special screw (or a face cam) 55.

The special screw (or the face cam) 55 is provided so as to realize the relationship between the EGR rate and the ratio between the fuel amount and the sum of the intake air amount and EGR gas amount illustrated in FIG. 1 when the engine rotational speed is $N_2$ (FIGS. 2 and 3). The fuel control shaft 54, the slide shaft 511, and the face cam or the special screw 55 are supported by a stay 56 which facilitates the realization of the alignment between the members 54, 511, and 55.

The EGR valve 3 is inserted in EGR pipes 1 and 2 which connect an exhaust manifold of the engine with an air intake manifold of the engine. The EGR valve 3 includes a casing 31, having an air-tight chamber 35, and a diaphragm 33. When there is no negative pressure in the air-tight chamber 35, a restoring coil spring 32 pushes back the diaphragm 33 and a valve body 34 to interrupt the passage between EGR pipes 1 and 2.

The solenoid valve 42 is provided between the vacuum switch 43 and the EGR valve 3. The solenoid valve 42 is controlled by signals from the computer 7 so as to supply either atmospheric pressure or negative pressure to the EGR valve 3.

The vacuum switch 43 is provided between the regulating valve 5 and the solenoid valve 42. The vacuum switch 43 is operated to turn an electric switch on when the pressure is less than the minimum pressure for enabling the EGR valve 3 to operate.

The vacuum pump 62 is coupled to, for example, the engine. The vacuum pump 62 can supply negative pressure higher than the negative pressure which causes the EGR valve 3 to be fully open.

The fuel control lever 52 is of a type directly coupled to a fuel pump. The fuel control lever 52 functions to vary the fuel amount in accordance with the change of the rotational angle of the shaft of the fuel control lever 52.

The computer 7 functions to compute, for example, the following equation:

$$E = E(0) \times f(N) \times f(\theta) \times f(P)$$

wherein, E is the final EGR amount, E(0) is the EGR amount corresponding to the rotational angle of the shaft of the fuel control lever, f(N) is a correction coefficient according to the engine rotational speed, $f(\theta)$ is a correction coefficient according to the coolant water temperature or the lubricant temperature, and f(P) is a correction coefficient according to the absolute pressure in the air intake pipe, the coefficient f(P) decreasing as the absolute pressure decreases. As a result of the calculation, the computer 7 produces a control signal which is supplied to the solenoid valve 42 for control of the operation of the EGR valve 3.

The engine rotational speed sensor 831 is associated with a rotor 83 which rotates according to the rotation of the engine. The coolant water temperature sensor 81 is attached to the path of the coolant water. The sensor 821 for detecting the absolute pressure is located in the air intake pipe 82.

In an embodiment of the present invention in which the detection of a value $\lambda$, which is the ratio of the intake air amount to the fuel amount multiplied by the stoichiometrical air-fuel ratio, is needed, a $\lambda$ sensor 84 is provided in the exhaust pipe. The $\lambda$ sensor 84 is provided in the system of FIG. 6 as illustrated in broken line.

Fundamentally, in the system of FIG. 6, the regulating valve 5 controls the negative pressure to realize the EGR amount for the rotational angle of the shaft 54 of the fuel control lever 52 on the basis of the characteristic illustrated in FIG. 1 when the rotational speed of the engine is $N_2$. The negative pressure is produced by the vacuum pump 62. When each of the values f(N), $f(\theta)$, and f(P) in the above described equation is 1, the lift of the valve body 34 of the EGR valve 3 is controlled by the negative pressure controlled by the regulating valve 5, and thus the EGR amount is controlled.

In the case where the running conditions are different from those in the above described case, e.g., the rotational speed of the engine is different from $N_2$, the coolant water temperature is low, or the absolute pressure in the air intake pipe is low, the control is carried out by using coefficients corresponding to such different running conditions. In such control, the computer 7 carries out and supplies a signal for control of the solenoid valve 42. Accordingly, the lift of the valve body 34 of the EGR valve 3 is changed and the EGR amount is controlled.

In the embodiment using the $\lambda$ sensor 84, the output signal of the $\lambda$ sensor 84 is supplied to the computer 7 for correction of the EGR amount with respect to $\lambda$.

When the negative pressure controlled by the regulating valve 5 becomes lower than the negative pressure for driving the EGR valve 3, the vacuum switch 43 turns on. Hence, a signal is supplied to the computer 7 to completely close the EGR valve 3, and, accordingly, the solenoid valve 42 is communicated with the atmospheric side. Thus, the pressure in the air-tight chamber 35 of the EGR valve 3 becomes equal to the atmospheric pressure, and, accordingly, the EGR amount becomes zero.

The correction coefficients f(N), $f(\theta)$, and f(P) may be selected under the following conditions. That is: f(N) is equal to 0 when the rotational speed N of the engine is lower than $N_1$, while equal to 1 when the rotational speed is $N_2$; $f(\theta)$ is equal to 0 when the coolant water temperature or the lubricant temperature is lower than $\theta_1$, while equal to 1 when the temperature is higher than $\theta_2$, where $\theta_2$ is higher than $\theta_1$; and f(P) is eithe equal to or larger than 0 and, when the absolute pressure in the air intake pipe is the normal pressure, is equal to 1.

The correction functions f(N) may also be selected under the following conditions. That is: f(N) is equal to 0 when the rotational speed of the engine is lower than $N_1$, while equal to 1 when the rotational speed is $N_2$, and is expressed in the form of a curve or a composition of connected straight lines in the range between $N_1$ and $N_2$. Also, f(N) is between 0 and 1 and larger than the ratio "$(N-N_1)/(N_2-N_1)$" when the rotational speed N is between $N_1$ and $N_2$.

According to another embodiment of the present invention, EGR is carried out only when the rotational speed of the engine is higher than a predetermined rotational speed. The principle of this EGR control system is based on the result of the investigations carried out by the inventors, described below.

That is, when EGR is attempted at a rotational speed of the engine lower than a predetermined speed, the operation of a governor of the engine has a large effect on the EGR control system, i.e., prevents the quick establishment of correspondence between the opening degree of the fuel control lever and the optimum EGR amount, thus making it difficult to carry out the correct EGR control. It has been known that incorrect EGR control causes the increase of emission of smoke, $NO_x$, HC, or the like. Accordingly, EGR control should not be carried out when the rotational speed of the engine is lower than the predetermined speed.

According to still another embodiment of the present invention, an idling position switch 53 can be provided in association with the fuel control lever 52, as illustrated in broken lines in FIG. 6. When the position of the fuel control lever 52 reaches the idling position, the idling position switch 53 is switched on. The switching signal from the idling position switch 53 is supplied to the computer 7. The inventors have confirmed the fact that it is desirable, from the viewpoint of the reduction of the engine noise and the improvement of the fuel consumption efficiency, to carry out EGR when the occurrence of idling is detected, even if the rotational speed of the engine is lower than the predetermined rotational speed.

Also, the inventors have confirmed the fact that it is desirable, from the same viewpoint, either to reduce the EGR amount or to stop the EGR when the coolant water temperature or the lubricant temperature is lower than a predetermined temperature.

Further, the inventors have confirmed the fact that it is desirable, from the same viewpoint, either to reduce the EGR amount or to stop the EGR when the absolute pressure in the air intake pipe is lower than a predetermined pressure.

Figure 7:
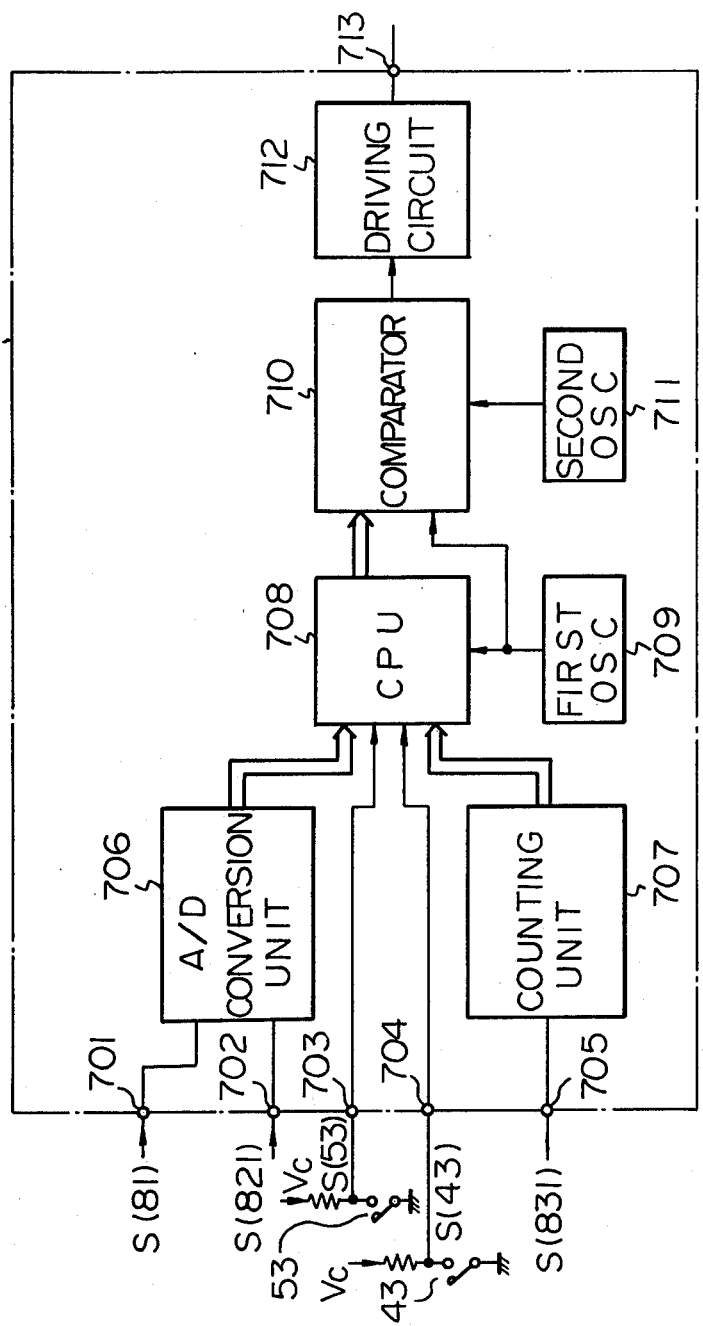
FIG. 7 illustrates an example of the structure of the computer used in the system of FIG. 6.

The structure of the computer 7 in this embodiment is illustrated in FIG. 7. Here, it should be noted that the fundamental structure of the computer 7 in this embodiment is basically similar to other embodiments shown in FIG. 6. For the purpose of simplifying the explanation, only a description of the structure of the computer 7 in this embodiment will be given.

The computer 7 of FIG. 7 includes an analog/digital (A/D) conversion unit 706, a counting unit 707, a central processing unit (CPU) 708, a first oscillator 709, a comparator 710, a second oscillator 711, and a driving circuit 712. The signal from the coolant water temperature sensor 81 is supplied to an input terminal 701. The signal from the intake air pressure sensor 821 is supplied to an input terminal 702. The signal from the idling position switch 53 is supplied to an input terminal 703. The signal from the vacuum switch 43 is supplied to an input terminal 704. The signal from the engine rotational speed sensor 831 is supplied to an input terminal 705. The A/D conversion unit 706 includes a multiplexer, an A/D converter, two memories, and a timing pulse generation circuit which generates a signal for switching the multiplexer, a signal for starting the A/D conversion unit, and a signal for selecting the two memories. The A/D converter and the two memories are of 12-bit structures.

The counting unit 707 includes a counter for counting the number of the pulses from the engine rotational speed sensor, a memory for storing the result of the counting, and a timing pulse generation circuit which generates a gate signal and a reset signal for the counting unit and a latch signal for the memory. The signal of the counted value in an 8 bit binary code is produced from the counting unit 707.

The CPU 708 includes a calculation circuit; a three-state buffer connecting the output terminals of the A/D conversion unit 706 and the counting unit 707, the input terminal 703, the input terminal 704, and the bus line of the calculation circuit; and a memory for storing the output signal of the calculation circuit. For example, a unit "TLCS-12A" manufactured by Tokyo Shibaura Electric Corporation is used for the calculation circuit. A clock frequency of 2 MHz is used in this unit. The operation of this unit is started and the initialization is carried out when power is supplied from a power source. The start of the operation of this unit corresponds to the predetermined address of a read only memory (ROM).

The first oscillator 709 generates trigger pulses of 20 Hz which are used for timer checking signals of the CPU 708 and reset signals of the comparator 710. The comparator 710 converts the binary code signal from CPU 708 into an output signal having the corresponding pulse width by using clock signals of 20 kHz from the second oscillator 711 and, as the starting point deciding signal, a trigger pulse from the first oscillator 709. The output signal of the comparator 710 is supplied to the driving circuit 712. The driving circuit 712 amplifies the input signal and supplies the amplified signal to the solenoid valve 42.

The operation routine of the CPU 708 in the computer 7 of FIG. 7 will be explained below.

(Step S0)
Routine is started when power is supplied from the power source.

(Step S1)
All memories in the CPU 708 are initialized.

(Step S2)
Timer checking is carried out. That is, the decision as to whether or not the signal from the first osciallater 709 is received is carried out. The waveform of the output signal S(709) of the first oscillator 709 is illustrated in the upper portion of FIG. 9. The signal is in HIGH potential for the period of 0.2 ms and in LOW patential for the other period. When the result of the decision is YES, the process proceeds to Step S3. When the result of the decision is NO, the process returns to Step S2 and the process of Step S2 is carried out again.

(Step S3)

Value of the signal S(81) stored in the A/D conversion unit 706 is read.

(Step S4)

Value of the signal S(821) stored in the A/D conversion unit 706 is read.

(Step S5)

HIGH/LOW potential of the signal S(53) is read.

(Step S6)

HIGH/LOW potential of the signal S(43) is read.

(Step S7)

Value N stored in the counting unit 707 is read.

(Step S8)

Value f(N) prepared in the N:(f(N) map is read by using the value N as address. Alternatively, it is possible to use linear interpolation on the basis of the programmed three points or the like in a ROM according to the characteristic of FIG. 8A.

(Step S9)

Value $D_1$ is obtained by multiplying $D_r$ by f(N). $D_r$ is the value when the duty ratio is 100%. When the frequency of the input clock pulse is 20 KHz and one period is 50 mS, the value of $D_r$ is 1000.

(Step S10)

Value f(θ) prepared in the θ:f(θ) map is read by using the value θ as address. Alternatively, linear interpolation can be used.

(Step S11)

Value $D_2$ is obtained by multiplying $D_1$ by f(θ).

(Step S12)

Value f(P) prepared in the P:f(P) map is read by using the value P as address. Alternatively, linear interpolation can be used.

(Step S13)

Value D is obtained my multiplying $D_2$ by f(P).

(Step S14)

Value D stored in a random access memory (RAM) is transmitted through the bus line to the memory in the CPU 708 and stored therein. The comparator 710 produces the output signal when the binary code value from the CPU 708, using the signal from the first oscillator 709 as reset signal, coincides with the number of clock pulses from the second oscillator 711. Hence, the ON period of the solenoid valve 42 is the period from a triggering by S(709) to a coincidence between the CPU code value and the second oscillator pulse number. The OFF period of the solenoid valve 42 is the period from the coincidence between the CPU code value and the second oscillator pulse number and a triggering by S(709). The waveform of the output signal of the comparator 710 is illustrated in the lower portion of FIG. 9. The period T, which corresponds to the on-off ratio of the solenoid valve 42, is expressed as: T=D×0.05 mS. The output signal of the comparator 710 is supplied to the driving circuit 712 to produce the driving signal to drive the solenoid 42.

After Step S14 is finished, the process returns to Step S2 and the routine from S2 to S14 is carried out again.

Figure 8A:
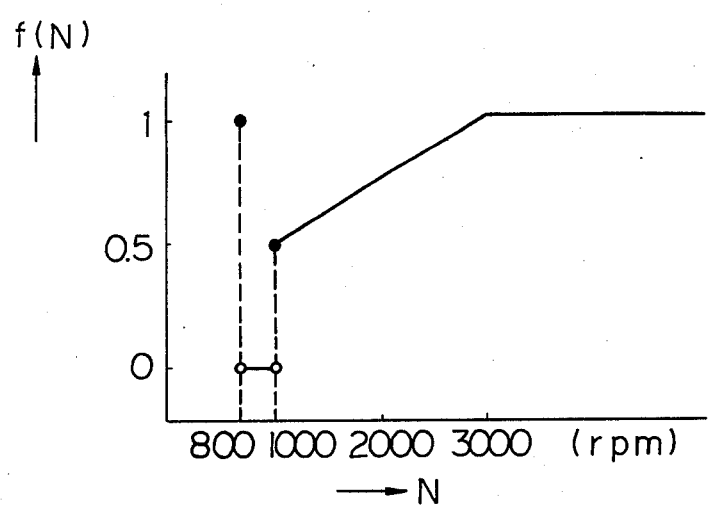
FIGS. 8A, 8B, and 8C illustrate the characteristics of correction coefficients for explaining some embodiments of the present invention.
Figure 8B:
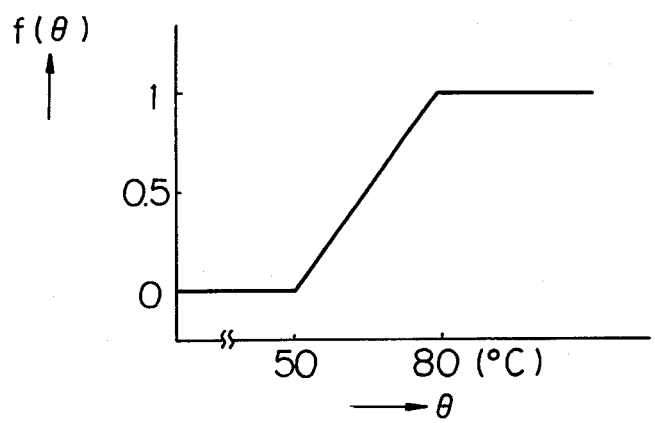
Figure 8C:
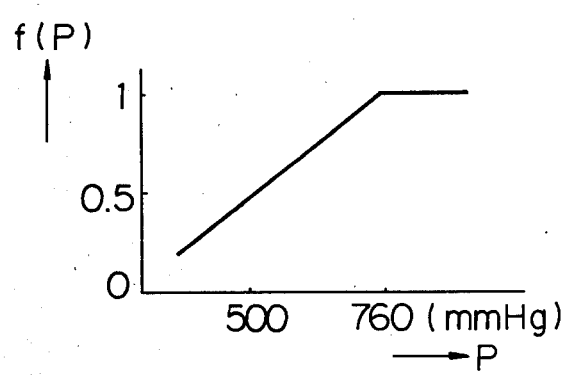
Figure 9:
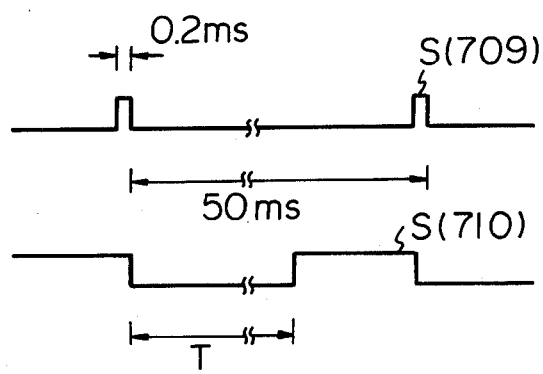
FIG. 9 illustrates the waveforms of the signals used in some embodiments of the present invention.

Returning to the embodiment, an example of the characteristic of correction coefficients f(N), f(θ), and f(P) is illustrated in FIGS. 8A, 8B, and 8C. An example of the waveforms of the signals used in this embodiment is illustrated in FIG. 9. In FIGS. 8A, 8B, and 8C, N represents the engine rotational speed, θ represents the coolant water temperature, and P represents the absolute pressure in the air intake pipe.

As illustrated in FIG. 8A, when the idling position switch 53 is in the ON position and the engine rotational speed is 800 rpm, the value of the correction coefficient f(N) is 1.

Instead of the detection of the idling by the idling position switch 53 in association with the fuel control lever 52, detection of the idling by using the data of the fuel amount stored in the computer 7 may also be adopted. Instead of the value 1 of f(P) for the normal pressure (760 mmHg) in FIG. 8C, the value 1 of f(P) for the pressure at the state of maximum supercharging may be adopted in the case where supercharging is carried out. In this supercharging case, the lift of the valve body of the EGR valve 3 and the maximum negative pressured by the pressure regulation are changed from those in the case without supercharging, maintaining the maximum EGR amount for the normal pressure.

Figure 10:
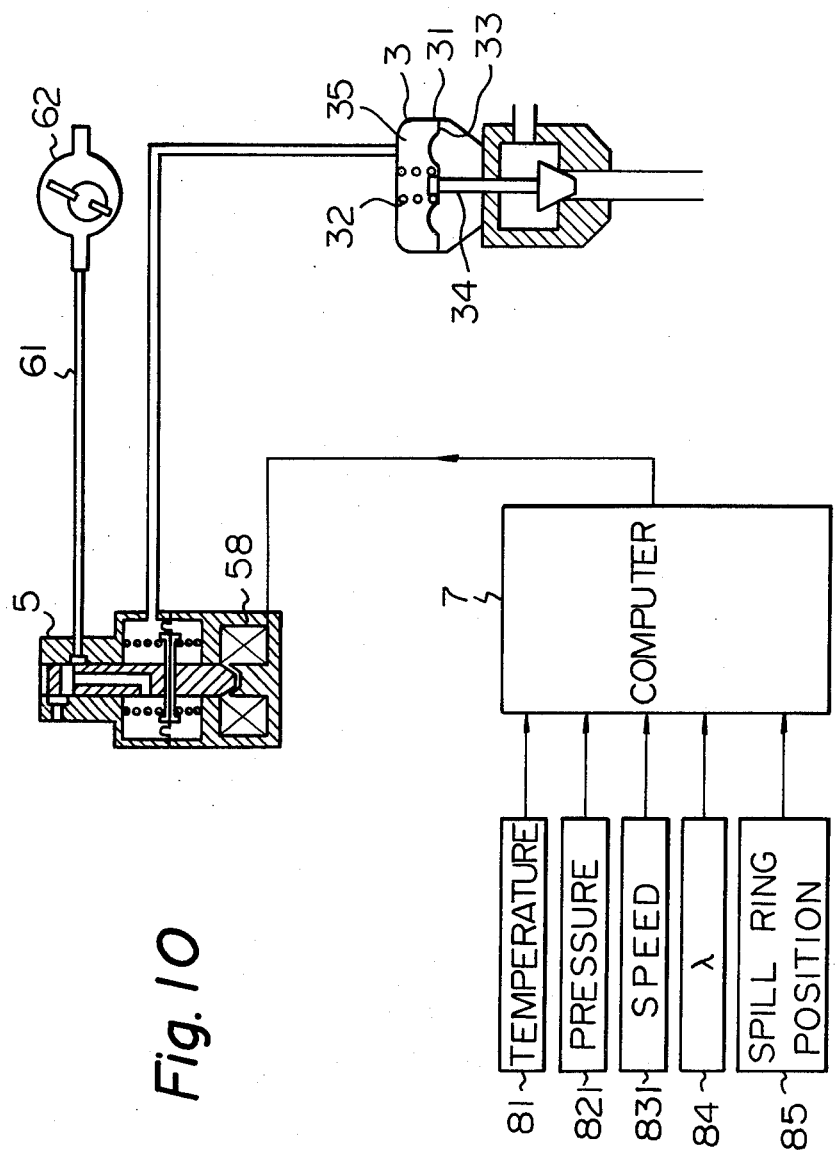
FIG. 10 illustrates an EGR control system for a diesel engine in accordance with a further embodiment of the present invention.

A further modified embodiment will be described with reference to FIG. 10. In the system of FIG. 10, a linear solenoid 58 is coupled to a regulating valve 5. The fuel amount is sensed by a position detection sensor 85 of a spill ring of a fuel controller of the engine. The signal of the sensed fuel amount is supplied to the computer 7. Also, the signals from the coolant water temperature sensor 81, the intake air pressure sensor 821, the speed sensor 831, and the λ sensor 84 are supplied to the computer 7. The output signal of the computer 7 is supplied to the linear solenoid 58. In the device of FIG. 10, no correction for the range between $N_1$ and $N_2$ is necessary. Only correction for the range higher than $N_2$ is carried out. A λ sensor 84 is located either in an exhaust pipe or in an air intake pipe. When located in the exhaust pipe, an $O_2$ concentration detection system using a zirconia element or the like is used. When located in the air intake pipe, an air flow meter of the heated wire type or the like is used.

In the system of FIG. 10, using the above sensed value and the fuel amount, the value λ is obtained by the calculation of the following equation:

$$\lambda = \frac{G(a)}{G(f) \cdot (A/F)_{st}}$$

We claim:

1. An EGR control system for a diesel engine, comprising:
   an EGR valve having a diaphragm chamber;
   a pressure supply means for supplying negative pressure;
   a regulating valve means, having an input path connected to said pressure supply means, an input path connected to the atmosphere and an output path connected to said diaphragm chamber of said EGR valve, for changing the areas of said input paths to regulate the negative pressure in said diaphragm chamber in response to an EGR rate signal;
   sensors for sensing a plurality of engine running conditions of said engine;
   means, responsive to one of the oxygen concentration in the exhaust gases and both the absolute pressure in an air intake pipe and the fuel amount, for generating an excessive air rate λ signal related to the ratio of the intake air amount to the fuel amount multiplied by the stoichiometric air-fuel ratio; and
   computing means, responsive to signals from said sensors and said detecting means, for controlling said regulating valve means to adjust the pressure of said diaphragm chamber of said EGR valve by generating said EGR rate signal in accordance with said engine running conditions and feedback corrected by said excessive air rate λ signal from said generating means.

2. A system as defined in claim 1, wherein said regulating valve means regulates the pressure supplied to said diaphragm chamber according to an amount of fuel being supplied to the engine.

3. A system as defined in claim 2, wherein engine rotational speed, coolant water temperature, lubricant temperature, and absolute pressure in an air intake pipe are used as said engine running conditions for generating said EGR rate signal.

4. A system as defined in claim 3, wherein said EGR rate signal includes a factor E related according to an equation:

$$E = E(0) \times f(N) \times f(\theta) \times f(P)$$

where E is the final EGR amount, E(0) is the EGR amount corresponding to the amount of fuel supplied to the engine, f(N) is a correction coefficient according to the engine rotational speed, f(θ) is a correction coefficient according to the coolant water temperature or the lubricant temperature, and f(P) is a correction coefficient according to the absolute pressure in the air intake pipe, the coefficient f(P) decreasing as the absolute pressure decreases.

5. A system as defined in claim 4, wherein f(N) is equal to 0 when the rotational speed of the engine is lower than a first predetermined speed $N_1$, while equal to 1 when the rotational speed is a second predetermined speed $N_2$; f(θ) is equal to 0 when the temperature of the coolant water or the lubricant temperature is lower than a first predetermined temperature $\theta_1$, while equal to 1 when the temperature is higher than a second predetermined temperature $\theta_2$, where $\theta_2$ is higher than $\theta_1$; and f(P) is either equal to or larger than 0, and is equal to 1 when the absolute pressure in the air intake pipe is the normal pressure.

6. A system as defined in claim 5, wherein f(N) is expressed in the form of a curve or a composition of connected straight lines in the range between $N_1$ and $N_2$, and f(N) is between 0 and 1 and larger than the ratio "$(N-N_1)/(N_2-N_1)$" where the rotational speed N is between $N_1$ and $N_2$.

7. A system as defined in claim 1, wherein said computing means causes EGR to be carried out only when the rotational speed of the engine is higher than a predetermined rotational speed.

8. A system as defined in claim 7, further comprising an idling detection means, said computing means causing EGR to be carried out when said idling detection means detects the occurrence of idling, even if the rotational speed of the engine is lower than said predetermined rotational speed.

9. A system as defined in claim 8, wherein said engine running conditions include at least one of the coolant water temperature and the lubricant temperature, said computing means causing EGR to be either reduced in amount or stopped when the result of the temperature detection indicates that said at least one of the coolant water temperature and the lubricant temperature is lower than a predetermined temperature.

10. A system as defined in claim 8, wherein said engine running conditions include the absolute pressure in an air intake pipe of the engine, said computing means causing EGR to be either reduced in amount or stopped when the result of the pressure detection indicates that the absolute pressure in the air intake pipe is lower than a predetermined pressure.

* * * * *